Aug. 14, 1934.   R. HARTE   1,970,137
METHOD OF MAKING SHOVELS AND LIKE IMPLEMENTS
Filed Sept. 9, 1932   3 Sheets-Sheet 1
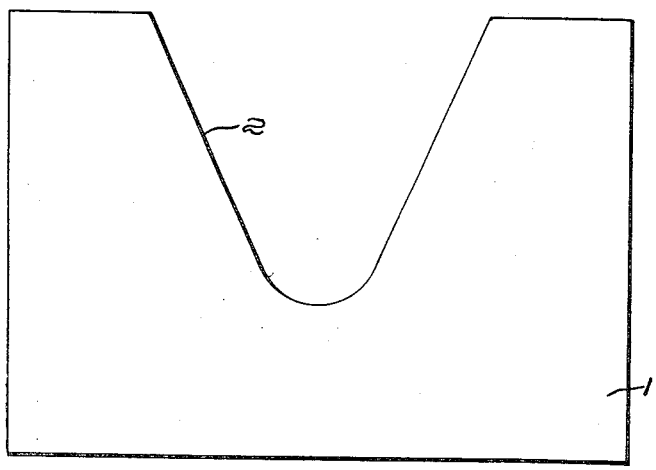
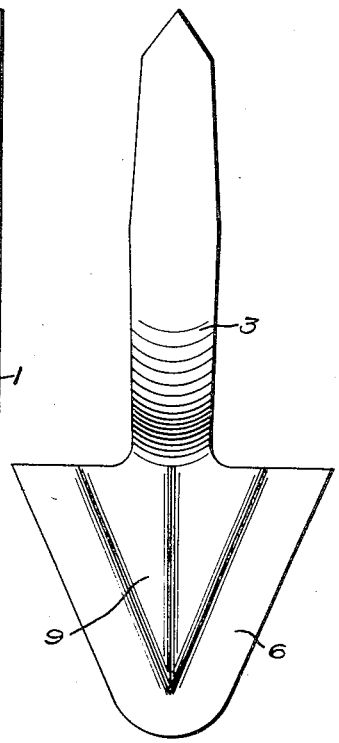
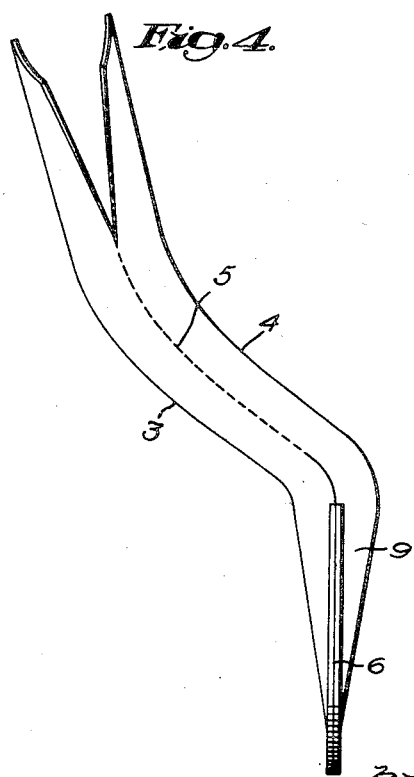
Inventor:
Richard Harte,

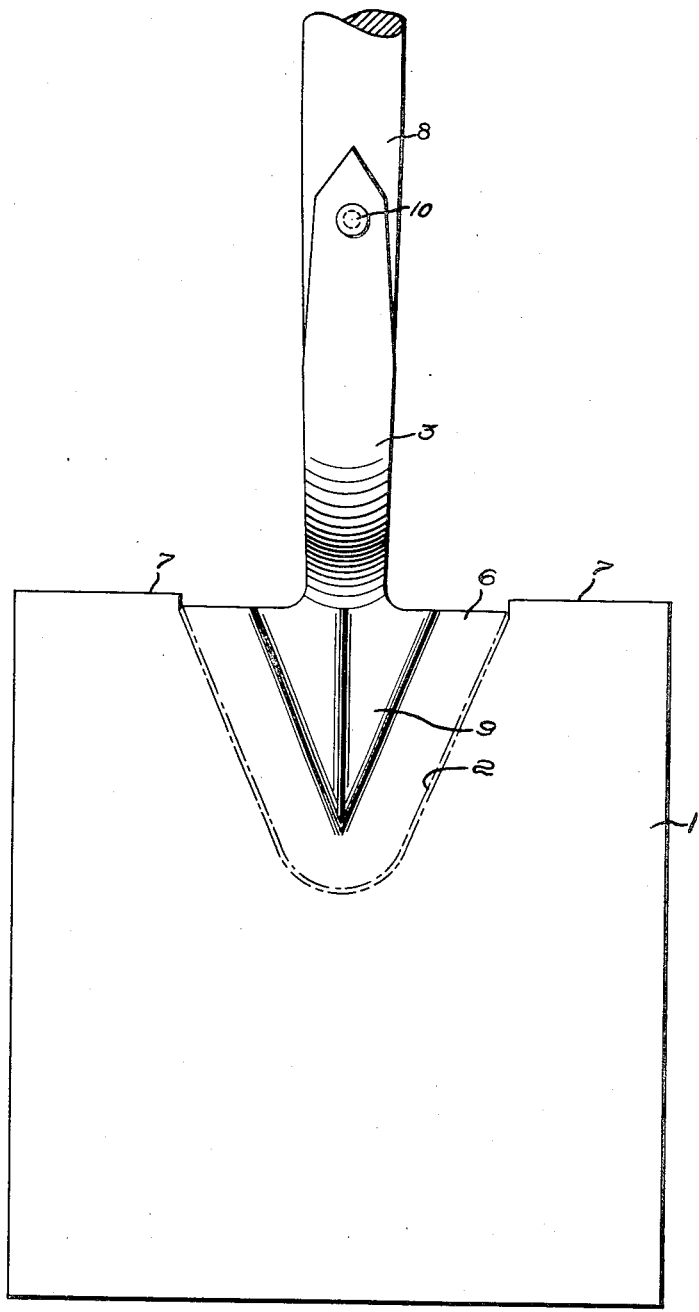

Aug. 14, 1934.                R. HARTE                 1,970,137
           METHOD OF MAKING SHOVELS AND LIKE IMPLEMENTS
                    Filed Sept. 9, 1932        3 Sheets-Sheet 3
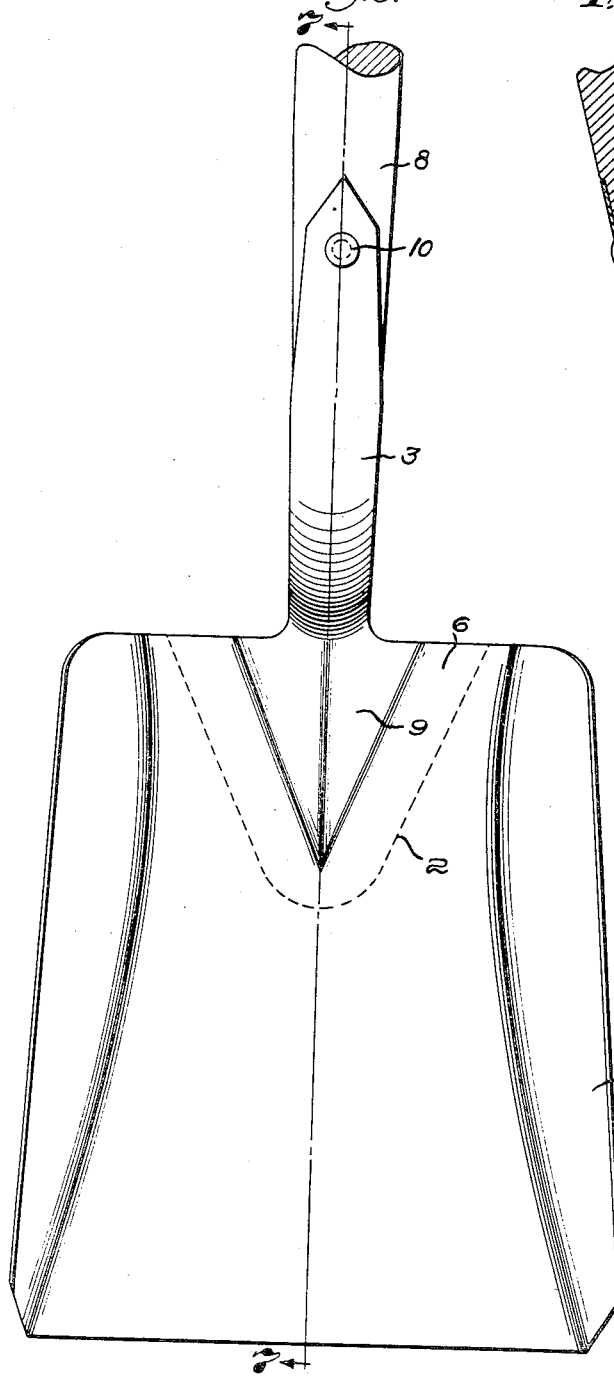
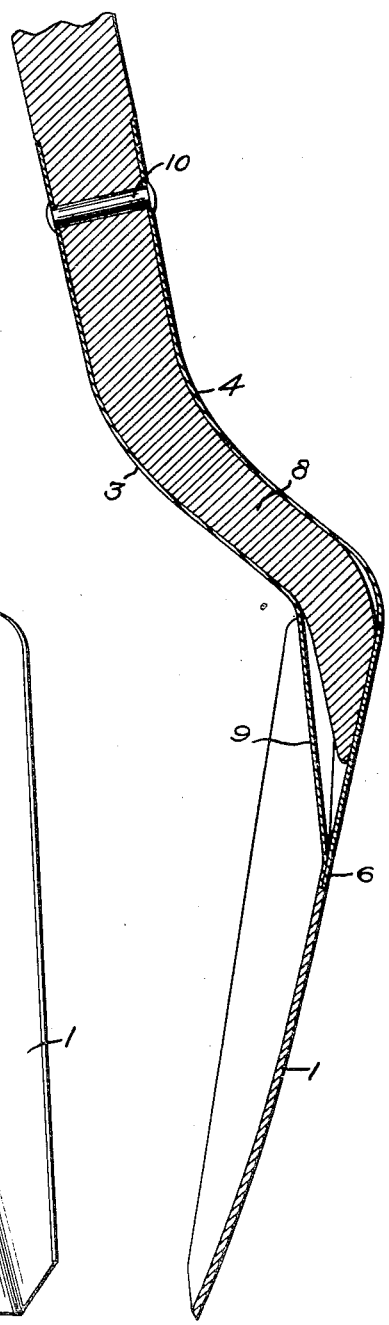
Inventor:
Richard Harte,
Emery Booth Varney & Townsend Attys Patented Aug. 14, 1934

1,970,137

UNITED STATES PATENT OFFICE 1,970,137

METHOD OF MAKING SHOVELS AND LIKE IMPLEMENTS

Richard Harte, Parkersburg, W. Va., assignor to Ames Baldwin Wyoming Co., Parkersburg, W. Va., a corporation of Delaware Application September 9, 1932, Serial No. 632,368

5 Claims. (Cl. 76—113)

My invention aims to provide improvements in the method of making shovel and like implements including a blade and a handle-receiving socket.

In the drawings which illustrate a preferred embodiment of my invention:—

Figure 1 is a front elevation of a blade blank prior to attachment of the socket means and prior to formation thereof;

Fig. 2 is an edge view of the blank shown in Figure 1 to illustrate the thickness thereof;

Fig. 3 is a front view of the preformed socket for attachment to the blade blank shown in Figure 1;

Figure 4 is a side elevation of the socket shown in Fig. 3;

Fig. 5 is a front elevation of the blade and socket after the two parts have been united and a portion of the socket structure and the whole of the blade blank have been rolled to the desired thickness;

Fig. 6 is a front view of the lower portion of a completed shovel; and

Fig. 7 is a section taken on the line 7—7 of Fig. 6.

My invention is applicable to various devices which include, as a combination, a blade or the like and a socket structure attached thereto and adapted to receive a handle. However, for the purpose of illustration only I have shown my invention, and will hereinafter describe the process of manufacture thereof, in connection with what is known as a plain back type of shovel. The usual commercial construction of this type of shovel includes a blade having a back strap integral therewith at the upper edge and a front strap having a portion welded to the front face of the shovel and a portion corresponding with and extending parallel to the back strap for reception of the wooden handle of the shovel structure. I am aware of various attempts to manufacture this type of shovel by using a separate back strap as well as a separate front strap both of which have been secured to the shovel blade in various manners. So far as I am aware, however, my invention as herein described is the only one by which a satisfactory and economical shovel of this type has been constructed. In the process of manufacture I utilize a method whereby the ultimate plain back type of shovel is constructed by the elimination of approximately fifteen operations heretofore employed in the manufacture of a similar type of shovel. Furthermore, my method of manufacture produces a shovel which is as strong, if not stronger, than shovels of this type commonly manufactured and sold.

I am aware of several different variations in the manufacture of the type of shovel I am about to describe and, therefore, it should be understood that the following described method relates to one of the best of which I have found to be satisfactory from a manufacturing standpoint.

Referring now to the specific embodiment of my invention illustrated by the drawings, I have shown (Figure 1) a blade blank 1 of thicker material than that desired for the finished blade. Also, the size of the blank is of less area than required for the finished blade. In the blade blank 1 I have cut a spear-shaped or blunt V-shaped notch 2 which extends from the upper edge of the blank and is cut entirely through the material thereof. The socket member to be attached to the blade blank 1 is formed from two pieces of metal properly shaped so that when they are placed together they provide a preformed socket adapted to receive a handle without further forming of the socket. The socket, as illustrated in Figs. 3 and 4, comprises a front member 3 and a back member 4 each of which has its lower portion formed to fit accurately in the notch 2. The upper portions of the members 3 and 4 provide straps which are shaped to a reverse curve in profile (Fig. 4) giving the desired lift to the shovel and in section to semi-circular form, at least for a portion of the length of each, so that when the two members are placed together (Fig. 4) they will present meeting edges to provide a tubular portion. Before attachment of the socket member to the blade blank 1 I prefer to secure the preformed members 3 and 4 together by welding the meeting edges along the side of the socket, as shown by dotted lines 5 on Fig. 4. Herein the cranked tubular portion so formed exhibits a reverse curve in profile, the extremities of the straps rearwardly thereof being straight or substantially so. This particular welded portion 5 on each side of the socket is in the nature of a butt-weld which, if desirable, may be carried down to the notch-engaging portion 6 provided by the members 3 and 4. Furthermore, if desirable, the upper edges of the notch-engaging portion 6 may be welded together.

After the socket members 3 and 4 have been formed and placed together to provide a socket device for receiving a handle, as shown in Fig. 4, the notch-engaging portion 6 is entered into the notch 2 in the blade blank 1 and preferably butt-welded along the meeting edges provided at the periphery of the portion 6 of the socket device and along the notch by the blade blank 1. In order to secure a strong weld, I preferably use a relatively thick blade blank material 1 and form the socket members 3 and 4 from material which, when the portions providing the notch-engaging means 6 are placed together, about equals the thickness of the material of the blade blank 1. During the butt-welding operation the socket member and blade blank are placed in a suitable device whereby when the notch-engaging portion 6 is entered longitudinally into the notch there will be a contacting of edge surfaces throughout the entire length of the meeting edges so that welding takes place uniformly. During the welding operation the portion 6 of the socket moves inwardly in the plane of the blank and leaves projecting ears 7—7 at the upper edge of the blank, as best shown in Fig. 5. This action is caused by the nature of butt-welding. It is desirable to have all the edges contact throughout their length during the welding operation if a strong, durable weld is to be provided. Therefore, I have found that the blade blank 1 and portion 6 should meet, as shown in dotted lines in Fig. 5, at the time the welding begins. Since the metal actually melts or flows during the welding the two parts must be pressed toward each other edgewise. Therefore, the parts assume the dash line positions (Fig. 5) upon completion of the welding operation and the ears 7—7 may be trimmed off later.

After the butt-welding operation has been completed, and the two members united, the entire device is placed in a rolling mechanism which is properly formed to roll the blade blank. During this rolling operation the blade blank and only a portion of the notch-engaging portion 6, adjacent to the weld, plus the weld are rolled to a thickness desired for the ultimate shovel blade. The rolling operation enlarges the area of the blank 1 to about the size illustrated in Fig. 5.

After the welding and rolling operations have been completed the blade blank 1 is properly trimmed and then pressed to the desired shape, as illustrated in Figs. 6 and 7. Thereafter a suitable wooden handle 8 is bull-dozed into the socket where it takes the curvature thereof and the free end extends into the frog portion 9 formed between the portions which provide the notch-entering portion 6, as best illustrated in Fig. 7. A rivet 10 is then passed through a preformed hole drilled through the front and back portions of the socket and the handle adjacent to their free ends. The ends of the rivet 10 are then headed and the handle 8 is thereby secured against axial movement relative to the socket.

If the required thickness for a shovel blade is great enough the blade blank 1 may be made the proper size to begin with and the rolling operation dispensed with. Therefore, it is necessary to roll the blank after attaching the socket only when a thinner blade, than can be properly butt-welded, is desired.

The portion 6 of the socket means is wider than the strap portions so that the frog portion 9 may permit the end of the handle to enter between the portions of the straps at that point for purposes well understood by those skilled in the art.

The method which I have just described in connection with the manufacture of my improved shovel is simple and the resulting shovel is entirely satisfactory. When shovels are made in accordance with my improved method certain operations which were heretofore entirely accomplished by hand labor are now accomplished by machine operations and many operations have been entirely eliminated. Furthermore, the relative size of the socket-engaging portion 6 with respect to the strap portion is such that the necessary material to form the strap portions into semi-circular cross-section is provided while at the same time providing butt-welded edges of sufficient length to make the completed shovel equally as strong, if not stronger, than the construction of the ordinary so-called plain back shovel. By preforming the socket to its desired shape before attachment to the blade and before receiving the handle I have eliminated the many operations heretofore necessary in connection with attachment of the handle and the formation of the straps.

While I have illustrated and described a preferred method of carrying out my invention, it will be readily understood by those skilled in the art that certain deviations from the method described may be made without going outside the scope of my invention. Therefore, I wish to have it clearly understood that my invention is best defined by the following claims.

I claim:—

1. A method of making shovels and the like which comprises preforming a socket member by shaping two strips of metal to provide portions of semi-tubular cross section and with a longitudinal profile to provide the desired lift, welding the margins of said semi-tubular portions together to provide a tubular body, attaching the ends of the so preformed socket to the rear of the blade blank and forcing a wooden handle into said tubular body to be shaped to the profile thereof.

2. The method of making shovel and like blades which comprises preforming a socket member by shaping two strips of metal to provide portions of semi-tubular cross section and with a longitudinal profile to provide the desired lift, the upper of said sections having an enlarged head which is shaped to provide a central frog, welding the margins of said portions together to provide a tubular body, welding the ends of said portions to the rear of a blade blank with said frog located at the rear central portion of the blade.

3. A method of making shovel and like blades which comprises preforming a socket member by shaping two strips of metal to provide shanks transversely curved to an arc and longitudinally curved to provide the desired lift and also to provide enlarged heads one of which is provided with a central frog, welding together the margins of said shanks to provide a tubular socket, providing a blade blank proper with a notch in its rear end corresponding to said heads, entering the heads in said notch and welding them to the margins thereof.

4. The method of making shovel and like blades which comprises preforming a socket member by shaping two strips of metal to provide portions of transversely curved section and longitudinally curved to provide the desired lift, and welding together the sides of said portions to provide a tubular seat for a handle, and welding the end of said socket to a blade blank proper and shaping the blade proper to desired form independently of the socket.

5. The method of making a shovel of the plain back type, which has an extension from the rear edge thereof and also has a member having an enlarged head attached to the rear central portion of the blade and an extension from said head which method comprises preliminarily forming said extensions to a profile having a reverse curve and semi-tubular section and uniting their margins to form a tubular socket having a reverse curve providing the desired lift, forcing a handle into said socket to be shaped thereto and securing the handle therein.

RICHARD HARTE.